US011214879B2

(12) United States Patent
Edgar et al.

(10) Patent No.: US 11,214,879 B2
(45) Date of Patent: Jan. 4, 2022

(54) ELECTROCHEMICAL APPARATUS FOR PRODUCING DISINFECTANT

(71) Applicant: H2envirO LLC, White Plains, NY (US)

(72) Inventors: Joseph A. Edgar, Pound Ridge, NY (US); Andrew Krefta, Limerick (IE)

(73) Assignee: H2ENVIRO LLC, White Plains, NY (US)

( * ) Notice: Subject to any disclaimer, the term of this patent is extended or adjusted under 35 U.S.C. 154(b) by 77 days.

(21) Appl. No.: 16/099,014

(22) PCT Filed: May 8, 2017

(86) PCT No.: PCT/US2017/031602
§ 371 (c)(1),
(2) Date: Nov. 5, 2018

(87) PCT Pub. No.: WO2017/193135
PCT Pub. Date: Nov. 9, 2017

(65) Prior Publication Data
US 2019/0136394 A1 May 9, 2019

Related U.S. Application Data

(60) Provisional application No. 62/332,989, filed on May 6, 2016.

(51) Int. Cl.
| | | |
|---|---|---|
| C25B 15/02 | (2021.01) | |
| C25B 1/26 | (2006.01) | |
| C25B 9/19 | (2021.01) | |
| C25B 15/029 | (2021.01) | |
| C25B 15/031 | (2021.01) | |
| C25B 15/033 | (2021.01) | |
| C02F 1/467 | (2006.01) | |
| G05D 16/20 | (2006.01) | |

(52) U.S. Cl.
CPC ................ *C25B 15/02* (2013.01); *C25B 1/26* (2013.01); *C25B 9/19* (2021.01); *C25B 15/029* (2021.01); *C25B 15/031* (2021.01); *C25B 15/033* (2021.01); *G05D 16/20* (2013.01); *C02F 1/4674* (2013.01)

(58) Field of Classification Search
CPC ................... C25B 1/26; C02F 1/4674
See application file for complete search history.

(56) References Cited

U.S. PATENT DOCUMENTS

| | | | |
|---|---|---|---|
| 5,422,014 A | 6/1995 | Allen et al. | |
| 6,296,744 B1 * | 10/2001 | Djeiranishvili | ..... C02F 1/46104 204/263 |
| 7,374,645 B2 | 5/2008 | Davis et al. | |
| (Continued) | | | |

FOREIGN PATENT DOCUMENTS

| | | | | |
|---|---|---|---|---|
| DE | 102006058454 B4 * | 1/2012 | ............. | C25B 15/02 |
| WO | 2011085316 A2 | 7/2011 | | |

OTHER PUBLICATIONS

International Search Report and Written Opinion dated Sep. 28, 2017 in International Application No. PCT/US17/31602.

*Primary Examiner* — Salil Jain
(74) *Attorney, Agent, or Firm* — Panitch Schwarze Belisario & Nadel LLP; Lars H. Genieser (57) ABSTRACT

An electrochemical apparatus for the production of a disinfectant from sodium chloride solution.

34 Claims, 4 Drawing Sheets

(56) References Cited

U.S. PATENT DOCUMENTS

| | | |
|---|---|---|
| 7,691,249 B2 | 4/2010 | Daly et al. |
| 8,002,955 B2 | 8/2011 | Daly et al. |
| 8,795,483 B2 | 8/2014 | Iltsenko et al. |
| 9,347,140 B2 | 5/2016 | van Kalken et al. |
| 9,777,383 B2 | 10/2017 | van Kalken et al. |
| 2004/0060815 A1 | 4/2004 | Buckley et al. |
| 2005/0084414 A1 | 4/2005 | Treiman |
| 2012/0267256 A1 | 10/2012 | Kindred |
| 2014/0124377 A1 | 5/2014 | Joynt |

* cited by examiner

FIG. 5

ELECTROCHEMICAL APPARATUS FOR PRODUCING DISINFECTANT

This application is a National Stage of International Application No. PCT/US2017/031602, filed May 8, 2017, which was published in the English language on Nov. 9, 2017 as International Publication No. WO 2017/193135 A1, which claims the benefit of the filing date of U.S. Provisional Application No. 62/332,989, filed May 6, 2016, the contents of all of which are hereby incorporated herein by reference in their entireties.

FIELD OF THE INVENTION

The present invention relates to an apparatus for the production of a disinfectant through electrochemical activation of sodium chloride solution.

BACKGROUND OF THE INVENTION

Disinfectant is used for numerous purposes, including water treatment. Such water treatment can be for purposes such as maintaining health, avoiding fouling, and preventing odor. Systems for producing disinfectant on site from benign sources, such as brine, find application.

SUMMARY OF THE INVENTION

An embodiment of the invention is an apparatus for producing an aqueous solution of hypochlorous acid disinfectant. The apparatus includes a brine source, a brine input flow control pump in fluid communication with the brine source, an electrochemical cell comprising an anode chamber having an anode and a cathode chamber having a cathode, and a membrane separating the anode chamber and the cathode chamber. The anode chamber is in fluid communication with the brine input flow control pump. A disinfectant output backpressure control valve is in fluid communication with the anode chamber, and the disinfectant output backpressure control valve receives an anode liquid output from the anode chamber. A disinfectant output line is in fluid communication with the disinfectant output backpressure control valve. The apparatus can have disinfectant in the disinfectant output line. A sodium hydroxide output backpressure control valve is in fluid communication with the cathode chamber, and the sodium hydroxide output backpressure control valve receives a cathode liquid output from the cathode chamber. A sodium hydroxide output line is in fluid communication with the sodium hydroxide output backpressure control valve. A blending valve is in fluid communication with the disinfectant output line and the sodium hydroxide output line. An ion sensor that provides an ion sensor value is in fluid communication with the disinfectant output line. A production control system is in data communication with the ion sensor. The production control system is configured to compare the ion sensor value with a ion target, and the production control system is configured to control at least a brine flow rate with the brine input flow control pump, a disinfectant backpressure with the disinfectant output backpressure control valve, a sodium hydroxide backpressure with the sodium hydroxide output backpressure control valve, and a differential pressure between the disinfectant output line and the sodium hydroxide output line with the blending valve in order to bring the ion sensor value to the ion target.

In the apparatus, the ion sensor can be a pH sensor, the ion sensor value can be a pH value, and the ion target can be a pH target. The ion sensor can be a free available chlorine (FAC) sensor, the ion sensor value can be an FAC value, and the ion target can be an FAC target. The ion sensor can be an oxidation-reduction potential (ORP) sensor, the ion sensor value can be an ORP value, and the ion target can be an ORP target. The ion sensor can be a conductivity sensor, the ion sensor value can be a conductivity value, and the ion target can be a conductivity target. In the apparatus, the ion sensor can include one or more of a pH sensor that provides a pH value with an associated pH target, an FAC sensor that provides an FAC value with an associated FAC target, an ORP sensor that provides an ORP value with an associated ORP target, and/or a conductivity sensor that provides a conductivity value with an associated conductivity target (in an embodiment, the ion sensor can include other types of sensors as well). In the apparatus, the ion sensor can include a pH sensor, an FAC sensor, and an ORP sensor, the pH sensor providing a pH value, the FAC sensor providing an FAC value, and the ORP sensor providing an ORP value, with the ion target including a pH target component, an FAC target component, and an ORP target component.

In the apparatus the blending valve can include a static mixer.

In an embodiment according to the invention, the blending valve can be either open or closed.

In the apparatus, an anode output pressure sensor can be in fluid communication with the anode chamber and can be in data communication with the production control system.

In an embodiment of the invention, the disinfectant output line includes a baffle tank in fluid communication with the disinfectant output backpressure control valve. The baffle tank is configured to remove gas bubbles from disinfectant in the disinfectant output line. The baffle tank can include a headspace containing gas. An air input can be in fluid communication with the headspace, and a gas output can be in fluid communication with the headspace. The baffle tank can include a liquid level gauge that provides a liquid level output, and the production control system can be data communication with the liquid level sensor. The liquid level gauge can be a differential pressure sensor in fluid communication with a bottom of the baffle tank and a headspace of the baffle tank.

In an embodiment of the invention, the apparatus includes a treatment mixing chamber and an untreated water supply in fluid communication with the treatment mixing chamber. The disinfectant output line is in fluid communication with the treatment mixing chamber. A treated water supply output is in fluid communication with the treatment mixing chamber. A treated ion sensor that provides a treated ion sensor value is in fluid communication with the treated water supply output. A disinfectant dosing control system is in data communication with the treated ion sensor. The disinfectant dosing control system is configured to compare the treated ion sensor value with a treated ion target. The disinfectant dosing control system is configured to control at least a brine flow rate with the brine input flow control pump, a disinfectant backpressure with the disinfectant output backpressure control valve, a sodium hydroxide backpressure with the sodium hydroxide output backpressure control valve, and a differential pressure between the disinfectant output line and the sodium hydroxide output line with the blending valve to bring the treated ion sensor value to the treated ion target. The apparatus can include an untreated flow rate meter that measures the flow rate of the untreated water supply and provides an untreated flow rate value, and the disinfectant dosing control system can be in data communication with the untreated flow rate meter. Alternatively or also, the untreated flow rate meter can be in data communication with a control system that adjusts a valve that regulates the flow rate of the untreated water supply. The untreated water supply and/or the treated water supply output can be in fluid communication with the anode chamber.

In an embodiment of the invention, the treated water supply output as the brine source can be in fluid communication with the brine input flow control pump.

In an embodiment of the invention, the brine source of the apparatus includes a source of water, a source of sodium chloride, and a brine mixing chamber. The source of water is in fluid communication with the mixing chamber through a water valve or water pump. The source of sodium chloride is in fluid communication with the mixing chamber through a sodium chloride valve or sodium chloride pump. The brine mixing chamber is in fluid communication with the brine input flow control pump. A brine conductivity sensor that provides a brine output conductivity value is in fluid communication with the brine mixing chamber. A brine preparation control system is in data communication with the brine conductivity sensor. The brine preparation control system is configured to compare the brine output conductivity value with a brine output conductivity target. The brine preparation control system is configured to control at least a water flow rate with the water valve or water pump and a sodium chloride flow rate with the sodium chloride valve or sodium chloride pump to bring the brine output conductivity value to the brine output conductivity target.

In an embodiment of the invention, the source of sodium chloride includes an untreated water supply.

In an embodiment of the invention, the apparatus includes a self-cleaning system. The self-cleaning system includes an acid source and an acid input flow pump in fluid communication with the acid source. The anode chamber and/or the cathode chamber are in fluid communication with the acid pump. An acid drain valve is in fluid communication with the anode chamber and/or the cathode chamber. An acid drain line is in fluid communication with the acid drain valve. A conductivity sensor is in electrical communication with the anode and in electrical communication with the cathode. That is, the anode and cathode serve as the sensing probes of the conductivity sensor. Alternatively, the conductivity sensor can have probes independent of the anode and the cathode, a probe in contact with fluid in the anode chamber and a probe in contact with fluid in the cathode chamber, although, in such case, the probes may need to be designed so that they are not susceptible to corrosion or degradation by fluid in the anode chamber or cathode chamber, including fluids, such as acids, that may be introduced for cleaning. The conductivity sensor is configured to determine the conductivity value between the anode and the cathode. A self-cleaning control system is in data communication with the conductivity sensor. The self-cleaning control system is configured to compare the conductivity value with a conductivity set point. The self-cleaning control system is configured to control at least the brine flow rate with the brine input flow control pump, an acid flow rate with the acid input flow pump, and the acid drain valve to bring the conductivity value to the conductivity set point.

In an embodiment of the invention, the apparatus is configured, so that the anode liquid output is not recirculated to the anode chamber and is not recirculated to the cathode chamber.

In an embodiment of the invention, the apparatus is configured, so that the cathode liquid output is not recirculated to the anode chamber and is not recirculated to the cathode chamber.

In an embodiment of the invention, the apparatus is configured, so that a portion or all of the cathode liquid output is recirculated to the anode chamber.

In an embodiment of the invention, the apparatus minimizes the production of hydrogen ($H_2$) gas.

In an embodiment of the invention, the apparatus produces an insubstantial quantity of chlorine ($Cl_2$) gas.

In an embodiment of the invention, the brine source includes an untreated water supply. The untreated water supply can be in fluid communication with the brine input flow control pump; the brine input flow control pump can be in fluid communication with a sand filter; and the sand filter can be in fluid communication with a filter, and the filter is in fluid communication with the anode chamber.

In an embodiment of the invention, a filter can be in fluid communication with an untreated water supply. A sand filter can be in fluid communication with the filter; the sand filter in fluid communication with the brine input flow control pump; and a turbidity meter that provides a turbidity value can be in fluid communication with the brine input flow control pump. The production control system can be in data communication with the turbidity meter.

In an embodiment of the invention, the apparatus further includes a treatment mixing chamber, an untreated water supply in fluid communication with the treatment mixing chamber, the disinfectant output line in fluid communication with the treatment mixing chamber, a treated water supply output in fluid communication with the treatment mixing chamber, a hydrogen sulfide ($H_2S$) sensor that provides a hydrogen sulfide concentration value in fluid communication with the treated water supply output, and a disinfectant dosing control system in data communication with the hydrogen sulfide sensor. The disinfectant dosing control system can be configured to compare the hydrogen sulfide concentration value with a hydrogen sulfide concentration target. The disinfectant dosing control system can be configured to control at least a brine flow rate with the brine input flow control pump, a disinfectant backpressure with the disinfectant output backpressure control valve, a sodium hydroxide backpressure with the sodium hydroxide output backpressure control valve, and a differential pressure between the disinfectant output line and the sodium hydroxide output line with the blending valve, in order to bring the hydrogen sulfide concentration value to or to less than the hydrogen sulfide concentration target. For example, the hydrogen sulfide ($H_2S$) concentration target is about 30 ppm (parts per million by weight).

In an embodiment of the invention, the apparatus further includes a treatment mixing chamber, an untreated fluid supply in fluid communication with the treatment mixing chamber, the disinfectant output line in fluid communication with the treatment mixing chamber, a treated fluid supply output in fluid communication with the treatment mixing chamber, a hydrogen sulfide sensor that provides a hydrogen sulfide concentration value in fluid communication with the treated fluid supply output, and a disinfectant dosing control system in data communication with the hydrogen sulfide sensor. The disinfectant dosing control system can be configured to compare the hydrogen sulfide concentration value with a hydrogen sulfide concentration target. The disinfectant dosing control system can be configured to control at least a brine flow rate with the brine input flow control pump, a disinfectant backpressure with the disinfectant output backpressure control valve, a sodium hydroxide backpressure with the sodium hydroxide output backpressure control valve, and a differential pressure between the disinfectant output line and the sodium hydroxide output line with the blending valve to bring the hydrogen sulfide concentration value to the hydrogen sulfide concentration target. The untreated fluid supply can include an organic fluid selected from the group consisting of and organic gas, an organic liquid, natural gas, synthetic gas, petroleum, petrochemical products, and combinations.

A method for producing a disinfectant according to the invention can include introducing brine at a brine flow rate into an anode chamber of an electrochemical cell with a brine input flow control pump, applying a voltage between an anode of the anode chamber and a cathode of a cathode chamber of the electrochemical cell, the anode chamber separated from the cathode chamber by a membrane, providing an anode liquid output from the anode chamber to a disinfectant output backpressure control valve in fluid communication with the anode chamber, establishing a disinfectant output backpressure with the disinfectant output backpressure control valve, obtaining a disinfectant from a disinfectant output line in fluid communication with the disinfectant output backpressure control valve, providing a cathode liquid output from the cathode chamber to a sodium hydroxide output backpressure control valve in fluid communication with the cathode chamber, establishing a sodium hydroxide output backpressure with the sodium hydroxide output backpressure control valve, further providing the cathode liquid output from the sodium hydroxide output backpressure control valve to a sodium hydroxide output line in fluid communication with the sodium hydroxide output backpressure control valve, establishing a differential pressure between the disinfectant output line and the sodium hydroxide output line with a blending valve in fluid communication with the disinfectant output line and the sodium hydroxide output line, measuring an ion concentration of the disinfectant in the disinfectant output line, comparing the ion concentration with an ion target, and bringing the ion concentration to the ion target by controlling (adjusting, regulating, or maintaining) the operation of the brine input flow control pump to regulate the brine flow rate, by controlling (adjusting, regulating, or maintaining) the operation of the disinfectant output backpressure control valve to regulate the disinfectant output backpressure, by controlling (adjusting, regulating, or maintaining) the operation of sodium hydroxide output backpressure control valve to regulate the sodium hydroxide output backpressure, and by controlling (adjusting, regulating, or maintaining) the operation of the blending valve to regulate the differential pressure between the disinfectant output line and the sodium hydroxide output line. The disinfectant can include hypochlorous acid (HClO), sodium hypochlorite (NaClO), and/or sodium chlorate ($NaClO_3$). For example, the disinfectant can include hypochlorous acid (HClO).

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated.

This application claims the benefit of U.S. Provisional Application No. 62/332,989, filed May 6, 2016, the specification of which is hereby incorporated by reference in its entirety.

Disinfectant can be produced through electrochemical activation of a sodium chloride solution by passing the sodium chloride solution through one or more electrolytic reactors (electrochemical cells) with resulting ion exchange. With an apparatus according to the invention, aqueous disinfectant produced through electrochemical activation can have a pH value and other characteristics that are predetermined by the user for a given application. For example, aqueous disinfectant with a pH at or above about 8 can be produced for odor control, or aqueous disinfectant with a pH in the range of from about 3 to about 7.5 can be produced for wastewater disinfection. The user can select another pH value, for example, a pH value in the range of from about 1, 2, 3, 4, 5, 5.5, 6, 6.5, 7, 7.5, 8, 8.5, 9, 10, 11, or 12 to about 2, 3, 4, 5, 5.5, 6, 6.5, 7, 7.5, 8, 8.5, 9, 10, 11, 12, or 13. The user can vary the pH of the aqueous disinfectant produced during its production.

The compact nature of the apparatus according to the invention allows it to be used in a number of environments, for example, in laboratory settings, in medical or veterinary clinics, such as in hospitals or physicians' offices, in plant or factory environments, such as for the food industry, in agriculture, in heating, air conditioning, and ventilation facilities or power plant facilities, for example, to disinfect water used in cooling towers (to prevent fouling), and to disinfect water for transport purposes.

Figure 1:
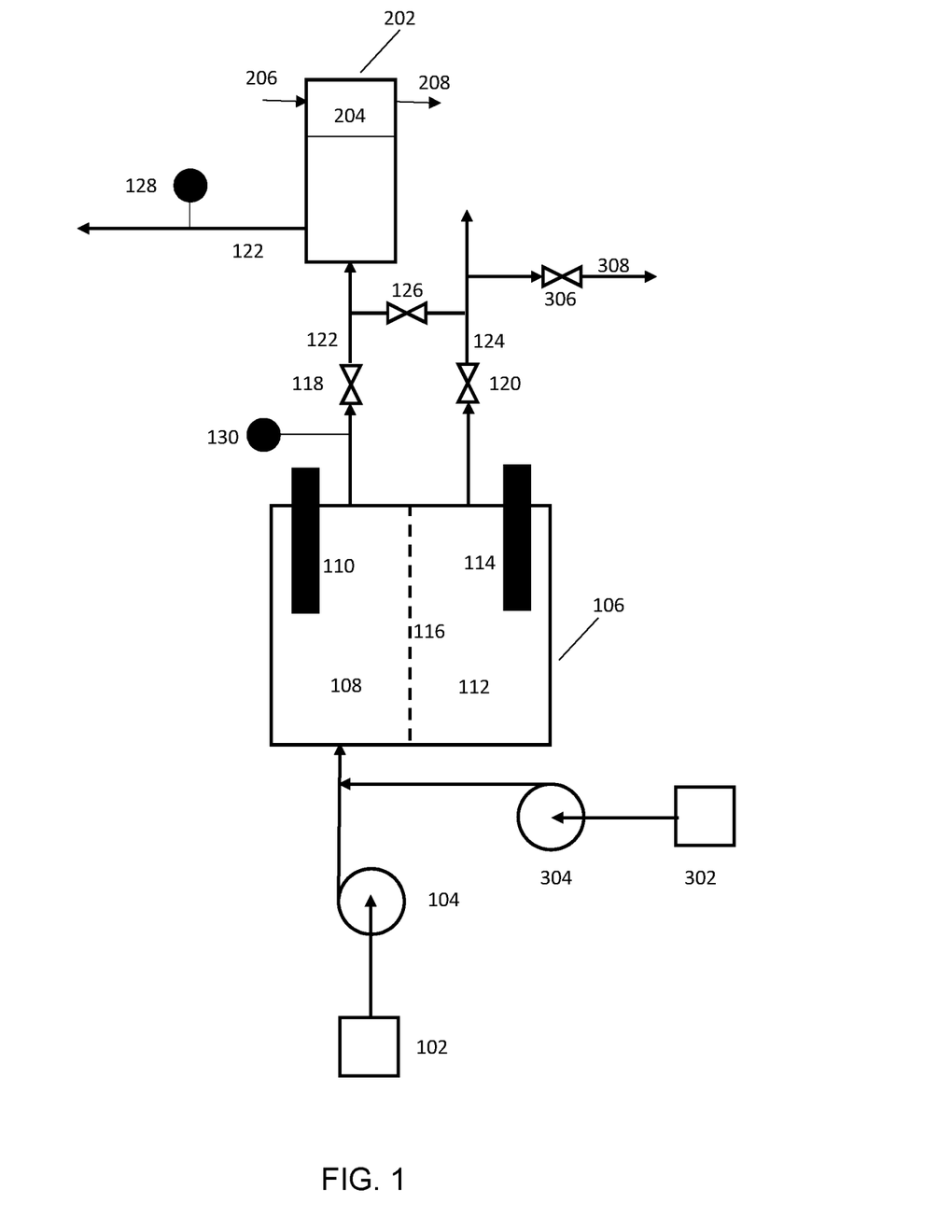
FIG. 1 is a schematic drawing of an apparatus for the production of a disinfectant through electrochemical activation of sodium chloride solution according to the invention.

An apparatus according to the invention can operate with the inputs of a sodium chloride solution (a brine source) and electricity (see, FIG. 1). (In this specification, any sodium chloride solution is referred to as "brine".) A brine input flow control pump 104 can regulate the flow of brine into the anode chamber 108, which has an anode 110, of an electrochemical cell 106. An anode liquid output can flow from the anode chamber 108. Without being bound by theory, in addition to water ($H_2O$), the anode liquid output can include sodium chloride (NaCl), hypochlorous acid (HClO), sodium hypochlorite (NaClO), and/or sodium chlorate ($NaClO_3$). A disinfectant output backpressure control valve 118 connected to (in fluid communication with) the anode chamber 108 can control a disinfectant backpressure in the anode chamber 108, and can regulate the flow of anode liquid output through the disinfectant output backpressure control valve 118 into a disinfectant output line 122.

In the electrochemical cell, the anode chamber can be separated from a cathode chamber 112, which has a cathode 114, by a membrane 116. A cathode liquid output can flow from the cathode chamber 112. Without being bound by theory, in addition to water, the cathode liquid output can include sodium hydroxide. A sodium hydroxide output backpressure control valve 120 connected to the cathode chamber 112 can control a sodium hydroxide backpressure in the cathode chamber 112, and can regulates the flow of cathode liquid output through the sodium hydroxide output backpressure control valve 120 and into a sodium hydroxide output line 124.

A blending valve 126 can connect (be in fluid communication with) the disinfectant output line 122 and the sodium hydroxide output line 124. The blending valve can be or include a static mixer. The blending valve can be adjustable to be either open or closed, or can be adjustable to have a range, for example, a continuous range, of positions, for example, from fully open, to partially open, to partially closed, to fully closed.

An electrical power supply can be connected to the anode 110 and cathode 114 to provide the electrical potential difference and current required for the electrochemical reaction producing the disinfectant to proceed.

By adjusting the disinfectant output backpressure control valve 118 and sodium hydroxide output backpressure control valve 120, the characteristics of the aqueous disinfectant produced as the anode liquid output can be controlled by the user. For example, the concentration of chemical species such as sodium chloride, hypochlorous acid, sodium hypochlorite, and/or sodium chlorate in the aqueous disinfectant, the concentration of ions, such as sodium ions, hydrogen ions, chloride ions, hypochlorite ions, and chlorate ions in the aqueous disinfectant, and related quantities such as pH, oxidation-reduction potential (ORP), and free available chlorine (FAC) of the aqueous disinfectant can be adjusted. Without being bound by theory, characteristics of the aqueous disinfectant produced may be adjusted by the backpressure determining the residence time of a fluid volume that enters the anode chamber 108 as brine and leaves the anode chamber 108 as the anode liquid output. Varying the residence time may adjust which of several competing chemical reactions dominate.

The disinfectant output backpressure control valve 118 and sodium hydroxide output backpressure control valve 120 can have a range of designs that allow the backpressure and liquid flow rate to be controlled, as will be appreciated by a person having skill in the art. For example, the valves can be designed to have internal pipe "blocks" with a predetermined internal diameter hole (through the middle of the block). An actuator stem can protrude from the top of the block and out of the pipe within which the block resides. The actuator stem can be positioned manually or by an actuator to adjust the backpressure and liquid flow rate. For example, an actuator can be a solenoid or a stepper motor inputs. An actuator can be controlled remotely, for example, by a control device, such as an electronic computer. The disinfectant output backpressure control valve 118 and sodium hydroxide output backpressure control valve 120 can be of identical, similar, or different design.

The disinfectant output line 122 can include a baffle tank 202 for elimination of aeration and gas bubbles from the anode liquid output after it exits the electrochemical cell 106 (see, FIG. 1). The elimination of bubbles of gas, such as hydrogen and air, within the solution allows the characteristics of the anode liquid output to be measured by one or more sensors, such as an ion sensor (which can be or include a conductivity sensor) in real time. The baffle tank 202 can include a headspace 204 containing gas. An input line 206 can provide a steady flow of air or another gas, such as nitrogen, into the headspace 204, to remove, for example, hydrogen from the headspace 204. For example, the air or other gas can be provided to the headspace 204 at a flow rate of about 20 liters/minute (at standard temperature and pressure). The baffle tank 202 can include a liquid level gauge to measure the level of liquid in the baffle tank 202. Such a liquid level gauge can be, for example, a float gauge, a sonic gauge, or a differential pressure sensor connected on either side of the pressure sensor to the bottom of the baffle tank 202 (which contains liquid) and to the headspace 204 (which contains gas). The level value provided by the liquid level gauge can be provided to a production control system. When the liquid level in the baffle tank is too high, the production control system can open an output valve or actuate a pump from the baffle tank to, for example, send the accumulated liquid in the baffle tank to a storage tank. When the liquid level in the baffle tank is too low, the production control system can close such an output valve or shut down such a pump.

For example, a sensor 128 placed after the baffle tank to measure characteristics of the anode liquid output can be an ion sensor, such as a pH sensor, an oxidation-reduction potential (ORP) sensor, a free available chlorine sensor, and/or a conductivity sensor. The sensor provides an output, for example, a pH sensor provides as output a pH value, an ORP sensor provides as output an ORP value, an FAC sensor provides as output an FAC value, and a conductivity sensor provides as output a conductivity value. Multiple sensors, for example, two, three, or four ion sensors, which can be the same or different, can be placed after the baffle tank 202. The use of multiple sensors can provide redundancy, or provide for measurement of multiple characteristics of the anode liquid output to allow for finer control of the composition of the anode liquid output and the aqueous disinfectant that it represents.

Alternatively, a dosing pump can be substituted for the baffle tank 202 and an associated storage tank, valve, and/or pump, for example, in apparatus designed to produce small quantities of disinfectant.

A production control system can be used to adjust process parameters to achieve desired characteristics of the aqueous disinfectant produced as the anode liquid output. The output of a sensor output (for example, an ion sensor value) can be provided to the production control system (that is, the production control system can be in data communication with the sensor 128, for example, an ion sensor). For example, the ion sensor value can be compared with an ion target established by a user. To bring the ion sensor value to the ion target, the production control system can control process parameters such as the brine flow rate by adjusting the brine input flow control pump 104, a disinfectant backpressure by adjusting the disinfectant output backpressure control valve 118, a sodium hydroxide backpressure by adjusting the sodium hydroxide output backpressure control valve 120, and a differential pressure between the disinfectant output line and the sodium hydroxide output line by adjusting the blending valve 126.

In an embodiment, the production control system can control the electrical power supply to control potential difference (voltage) between the anode 110 and cathode 114 in the electrochemical cell 106 or to control electrical current flow between the anode 110 and cathode 114 in the electrochemical cell 106. Alternatively, a voltage meter can measure the potential difference (voltage) between the anode 110 and cathode 115 in the electrochemical cell 106, and the measured voltage can be provided to the production control system, which can then adjust the brine input flow control pump 104 to adjust the voltage to a desired value.

Control systems in, of, or for the apparatus, such as the production control system, self-cleaning control system, brine preparation control system, and disinfectant dosing control system, can be designed to function independently of each other or can be designed to function in an integrated manner. For example, the production control system, self-cleaning control system, brine preparation control system, and/or disinfectant dosing control system can be in data communication with each other to function in an integrated manner.

Additional pumps, valves, and/or sensors can be included in the apparatus, for example, to provide redundant means for control of process parameters or measuring characteristics of liquid in the apparatus. For example, a flow meter can measure the flow rate of brine into the anode chamber of an electrochemical cell. For example, flow meter can measure the flow rate of anode liquid output and a flow meter can measure the flow rate of cathode liquid output. For example, an anode output pressure sensor 130 in contact with the anode liquid output, between the anode chamber 108 and the disinfectant output backpressure control valve 118 or at the disinfectant output line 122 can provide a pressure measurement. For example, such a pressure measurement can be used to monitor for excessive pressures within the electrochemical cell 106 that could result in rupture of the membrane 116. The readings of (values provided by) such sensors can be provided to the production control system. For example, the production control system can compare the values provided by such sensors to monitor for fault conditions in the apparatus, such as leaks.

The apparatus can be configured to minimize the production of hydrogen ($H_2$) gas. For example, the production control system can use the inputs of the one or more sensors to adjust process parameters, for example, by adjusting pumps and valves, to minimize the production of hydrogen gas. For example, the apparatus can produce less than about 10 liters of hydrogen gas, less than about 1 liter of hydrogen gas, less than about 0.1 liters of hydrogen gas, less than about 0.01 liters of hydrogen gas, less than about 0.001 liters of hydrogen gas, or less than about 0.0001 liters of hydrogen gas per 1000 liters of aqueous disinfectant (anode liquid output) produced (where "liters of hydrogen gas" are at standard temperature and pressure). For example, the apparatus can produce no measurable quantity of hydrogen gas.

The apparatus can be configured to produce an insignificant amount of chlorine ($Cl_2$) gas. For example, the production control system can use the inputs of the one or more sensors to adjust process parameters, for example, by adjusting pumps and valves, to minimize the production of chlorine gas. For example, the apparatus can produce less than about 0.1 liters of chlorine gas, less than about 0.01 liters of chlorine gas, less than about 1 milliliter of hydrogen gas, less than about 0.1 milliliters of chlorine gas, less than about 0.01 milliliters of chlorine gas, or less than about 1 microliter of chlorine gas per 1000 liters of aqueous disinfectant (anode liquid output) produced (where "liters of chlorine gas" are at standard temperature and pressure). For example, the apparatus can produce no measurable quantity of chlorine gas.

The apparatus can include a self-cleaning system. The self-cleaning system can include an acid source 302 and an acid input flow pump 304 connected to (in fluid communication with) the acid source 302. The acid of the acid source 302 can have low pH or high pH (for an acid) or any pH in between. An acid drain line 308 can be connected to the anode chamber 108 and/or the cathode chamber 112 through an acid drain valve 306. A conductivity sensor can be connected to the anode 110 and the cathode 114 to measure the conductivity value across the electrochemical cell 106, that is, between the anode 110 and the cathode 114. The conductivity value can indicate when the electrochemical cell 106 requires cleaning. Without being bound by theory, minerals present in the brine can accumulate on the anode 110 and/or the cathode 114 and decrease the flow of electricity (that is, decrease the conductivity) between the anode 110 and the cathode 114, thereby decreasing the efficiency of the electrochemical cell 106. The conductivity value can be provided to a self-cleaning control system. The conductivity value can be compared to a conductivity set point established by a user. When the conductivity value is lower than the conductivity set point, the self-cleaning control system can activate a self-cleaning cycle. For example, the self-cleaning control system can shut off the brine input flow control pump 104 and direct acid through the electrochemical cell 106 by activating the acid input flow pump 304 and opening the acid drain valve 306 for a predetermined time. In activating the self-cleaning cycle, the self-cleaning control system can independently open or close the disinfectant output backpressure control valve 118, the sodium hydroxide output backpressure control valve 120, and/or the blending valve 126, and/or other valves that may be present in the apparatus. During the self-cleaning cycle, the self-cleaning control system can independently vary the positions of each of the disinfectant output backpressure control valve 118, the sodium hydroxide output backpressure control valve 120, and/or the blending valve 126, and/or other valves that may be present in the apparatus, for example, from fully closed to partially closed to partially open to fully open. For example, during the self-cleaning cycle, the self-cleaning control system can initially close the disinfectant output backpressure control valve 118, close the blending valve 126, and open the sodium hydroxide output backpressure control valve 120, in order to clean the cathode chamber 112 (in such case, it may also be necessary to direct the output of the acid input flow pump 304 to the cathode chamber 112, by placing the acid input flow pump 304 in fluid communication with (connecting it to) the cathode chamber 112). For example, after a predetermined amount of time, the self-cleaning control system can then close the sodium hydroxide output backpressure control valve 120, open the disinfectant output backpressure control valve 118, and open the blending valve 126, in order to clean the anode chamber 108 (in such case, it may also be necessary to isolate the baffle tank 202 by closing an additional valve located between the baffle tank 202 and the conduit leading from the disinfectant output line 122 to the blending valve 126). At the end of the self-cleaning cycle, the self-cleaning control system can shut off the acid input flow pump 304, close the acid drain valve 306, and reactivate the brine input flow control pump 104. If the self-cleaning control system had closed (or fully opened) the disinfectant output backpressure control valve 118 and/or the sodium hydroxide output backpressure control valve 120, it can open these (or set them to a position intermediate between open and closed). Similarly, if the self-cleaning control system had closed (or opened) the blending valve 126, it can change the position of the blending valve 126 (for example, to fully open, fully closed, or an intermediate position) to achieve the desired characteristics set by the user of the aqueous disinfectant produced by the apparatus. Alternatively, the acid source 302 can be connected to the brine input flow control pump 104, and the brine input flow control pump 104 can be used to circulate the acid through the electrochemical cell 106 and other parts of the apparatus.

Figure 3:
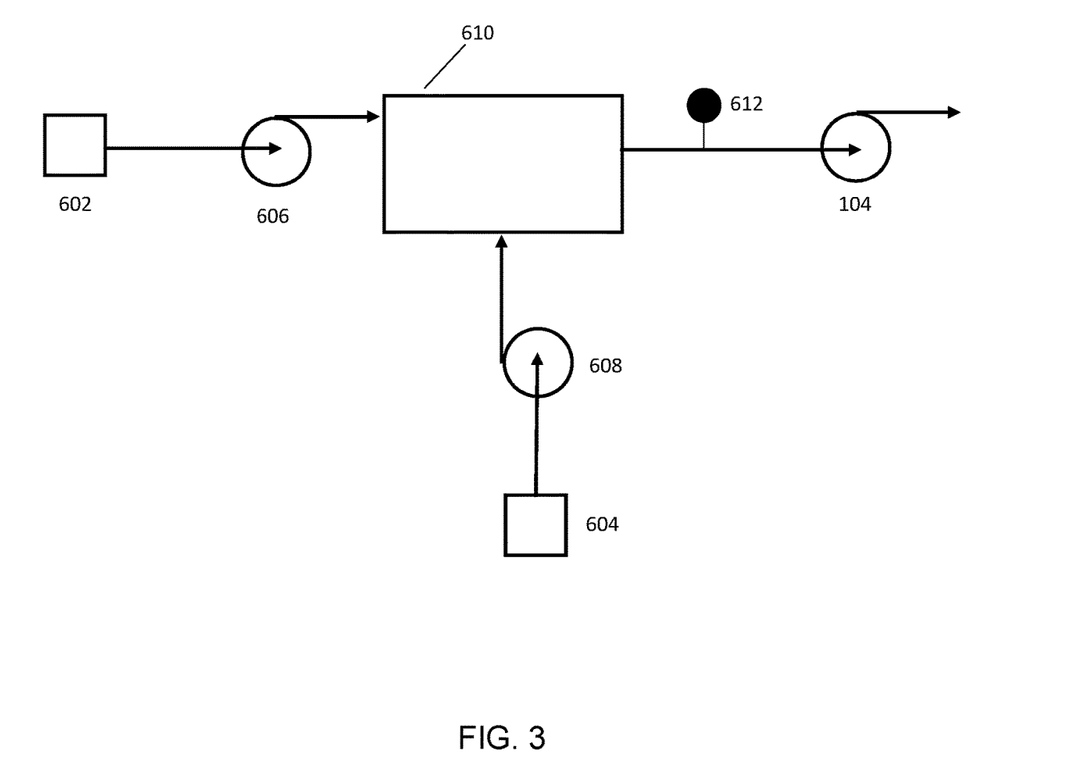
FIG. 3 is a schematic drawing of an embodiment of a brine source of an apparatus according to the invention.

The brine source 102 of the apparatus can include features and/or a subsystem for preparing the brine. A source of water 602 can be connected through a water valve or water pump 606 and a source of sodium chloride 604 can be connected through a sodium chloride valve or sodium chloride pump 608 to a brine mixing chamber 610 (see, FIG. 3). The brine mixing chamber 610 can include a static mixer or an impeller to actively mix the water and the sodium chloride. The brine mixing chamber 610 can be connected to the brine input flow control pump 104. A brine conductivity sensor 612 that provides a brine output conductivity value can be in contact with the brine in the brine mixing chamber 610 or at an outlet of the brine mixing chamber 610. The brine output conductivity value can be provided to a brine preparation control system. The brine preparation control system can compare the brine output conductivity value with a brine output conductivity target. The brine preparation control system can control the water flow rate with the water valve or water pump 606 and the sodium chloride flow rate with the sodium chloride valve or sodium chloride pump 608 in order to bring the brine output conductivity value to the brine output conductivity target. For example, the source of sodium chloride 604 can include or be an untreated water supply 404.

The apparatus can include features for administering (dosing) the aqueous disinfectant produced to untreated water in need of purification or disinfection. For example, a untreated water supply 404 can be connected to (in fluid communication with) a treatment mixing chamber 402 (see, FIG. 2). A flow rate meter, termed in this position an untreated flow rate meter 410, can measure the rate of flow of untreated water from the untreated water supply 404, and provide an untreated flow rate value. The untreated flow rate value can be provided to the disinfectant dosing control system. The disinfectant output line 122 of the apparatus can be connected to the treatment mixing chamber 402 to feed disinfectant into the treatment mixing chamber 402. For example, the treatment mixing chamber 402 can include a static mixer. The treated water, containing the untreated water and the disinfectant, can exit the treatment mixing chamber 402 through a treated water supply output 406. A sensor 408, such as an ion sensor, here termed a treated ion sensor, providing a treated ion sensor value, can be in contact with (in fluid communication with) the treated water supply exiting the treatment mixing chamber at the treated water supply output 406. The treated ion sensor value can be provided to a disinfectant dosing control system, which can compare the treated ion sensor value to a treated ion target. To bring the treated ion sensor value to the treated ion target, the disinfectant dosing control system can control process parameters such as the brine flow rate by adjusting the brine input flow control pump 104, a disinfectant backpressure by adjusting the disinfectant output backpressure control valve 118, a sodium hydroxide backpressure by adjusting the sodium hydroxide output backpressure control valve 120, and a differential pressure between the disinfectant output line and the sodium hydroxide output line by adjusting the blending valve 126. That is, the disinfectant control system can control the rate and/or concentration at which disinfectant is produced by the apparatus to add disinfectant to the untreated water of the untreated water supply 404 to approach or achieve the desired treatment result.

Figure 2:
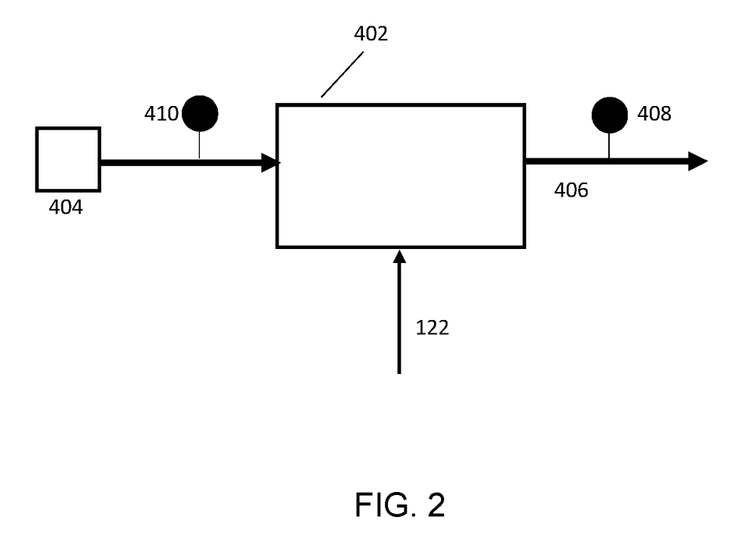
FIG. 2 is a schematic drawing of a portion of an apparatus according to the invention for administering disinfectant produced to untreated water.

The sensor 408 can be a hydrogen sulfide sensor that provides a hydrogen sulfide concentration value. The hydrogen sulfide concentration value can be provided to the disinfectant dosing control system, which can compare the hydrogen sulfide concentration value to a hydrogen sulfide concentration target. To bring the hydrogen sulfide concentration value to the hydrogen sulfide concentration target, the disinfectant dosing control system can control process parameters such as the brine flow rate by adjusting the brine input flow control pump 104, a disinfectant backpressure by adjusting the disinfectant output backpressure control valve 118, a sodium hydroxide backpressure by adjusting the sodium hydroxide output backpressure control valve 120, and a differential pressure between the disinfectant output line and the sodium hydroxide output line by adjusting the blending valve 126. That is, the disinfectant control system can control the rate and/or concentration at which disinfectant is produced by the apparatus to add disinfectant to the untreated water of the untreated water supply 404 to approach or achieve reduction of the hydrogen sulfide concentration to the hydrogen sulfide concentration target.

Such reduction of hydrogen sulfide concentration in water can be necessary or desirable to reduce or eliminate an unpleasant or noxious "rotten egg" odor that results from using certain water supplies. Without being bound by theory, and by way of example, hypochlorous acid (HClO) in disinfectant produced by an apparatus according to an embodiment of the invention can react with hydrogen sulfide ($H_2S$) in water to produce hydrochloric acid (HCl), water ($H_2O$), and sulfur (S), thereby reducing the concentration of or eliminating hydrogen sulfide in a water source. Without being bound by theory, and by way of example, sodium hypochlorite (NaClO) in disinfectant produced by an apparatus according to an embodiment of the invention can react with hydrogen sulfide ($H_2S$) in water to produce sodium chloride (NaCl), water ($H_2O$), and sulfur (S), thereby reducing the concentration of or eliminating hydrogen sulfide in a water source. Administering disinfectant produced by the apparatus can reduce the concentration of hydrogen sulfide in water to, for example, less than about 0.0001, 0.0003, 0.001, 0.003, 0.01, 0.03, 0.1, 0.3, 1, 3, 10, 30, 100, 300, 1000, or 10000 ppm (parts per million by weight).

The sensor 408 can include several sensors, such as an ion sensor, a hydrogen sulfide sensor, and/or another sensor, to approach or achieve water treatment objectives that include multiple parameters, for example, reducing the concentration of bacteria and reducing the concentration of hydrogen sulfide in water.

In an embodiment, a portion (or the entirety) of the treated water from the treated water supply output 406 is recirculated to the anode chamber 108. For example, the input of a recirculation pump can be in fluid communication with the treated water supply output 406 and the output of the recirculation pump can be in fluid communication with the anode chamber 108. A portion (or the entirety) of the treated water from the treated water supply output 406 can be in fluid communication with the brine input flow control pump 104.

In an embodiment, a portion (or the entirety) of the untreated water from the untreated water supply 404 is pumped to the anode chamber 108. For example, the input of a pump can be in fluid communication with the untreated water supply 404 and the output of the pump can be in fluid communication with the anode chamber 108.

In an embodiment, the anode liquid output is not recirculated to the anode chamber 108 and is not recirculated to the cathode chamber 112. For example, the apparatus is not configured to have the input of a pump in fluid communication with the anode chamber 108 and have the output of the pump in fluid communication with the anode chamber 108 or the cathode chamber 112.

In an embodiment, the cathode liquid output is not recirculated to the anode chamber 108 and is not recirculated to the cathode chamber 112. For example, the apparatus is not configured to have the input of a pump in fluid communication with the cathode chamber 112 and have the output of the pump in fluid communication with the anode chamber 108 or the cathode chamber 112.

In an embodiment, a portion (or the entirety) of the cathode liquid output is recirculated to the anode chamber 108. For example, the apparatus is configured to have the input of a recirculation pump in fluid communication with the cathode chamber 112 and have the output of the recirculation pump in fluid communication with the anode chamber 108.

The disinfectant output line 122 can provide disinfectant to a storage tank for later use.

Multiple electrochemical cells 106 and associated features, such as piping, valves, pumps, and sensors can be included in an apparatus. For example, such multiple electrochemical cells can receive brine from the same brine source 102 or different brine sources and can provide disinfectant to the same disinfectant output line 122 or different disinfectant output lines. Such multiple electrochemical cells 106 can share a common production control system or each have independent production control systems. Such multiple electrochemical cells 106 can share a common electrical supply or each have independent electrical supplies. Having multiple electrochemical cells 106 in the same apparatus can, for example, provide redundancy in case of failure of one of the electrochemical cells 106.

A method for producing an aqueous solution of hypochlorous acid disinfectant can include the following. A brine input flow control pump 104 can be used to introduce brine at a brine flow rate into an anode chamber 108 of an electrochemical cell 106. A voltage can be applied between an anode 110 of the anode chamber 108 and a cathode 114 of a cathode chamber 112 of the electrochemical cell 106; the anode chamber 108 can be separated from the cathode chamber 112 by a membrane 116. A disinfectant output backpressure can be established with a disinfectant output backpressure control valve 118 in fluid communication with the anode chamber 108, the disinfectant output backpressure control valve 118 receiving an anode liquid output from the anode chamber 108. Disinfectant can be obtained from a disinfectant output line 122 in fluid communication with the disinfectant output backpressure control valve 118. A sodium hydroxide backpressure can be established with a sodium hydroxide output backpressure control valve 120 in fluid communication with the cathode chamber 112, the sodium hydroxide output backpressure control valve 120 receiving a cathode liquid output from the cathode chamber 112. A differential pressure can be established between the disinfectant output line 122 and a sodium hydroxide output line 124 with a blending valve 126 in fluid communication with the disinfectant output line 122 and the sodium hydroxide output line 124, the sodium hydroxide output line 124 in fluid communication with the sodium hydroxide output backpressure control valve 120. An ion concentration can be measured with an ion sensor 128 in fluid communication with the disinfectant output line 122. The ion concentration can be compared with an ion target. The ion concentration can be brought to the ion target by controlling the brine input flow control pump 104 to regulate the brine flow rate, controlling the disinfectant output backpressure control valve 118 to regulate the disinfectant output backpressure, controlling the sodium hydroxide output backpressure control valve 120 to regulate the sodium hydroxide output backpressure, and controlling the blending valve 126 to regulate the differential pressure between the disinfectant output line 122 and the sodium hydroxide output line 124. The production of hydrogen ($H_2$) gas can be minimized and the production of chlorine ($Cl_2$) gas can be rendered insubstantial.

Figure 4:
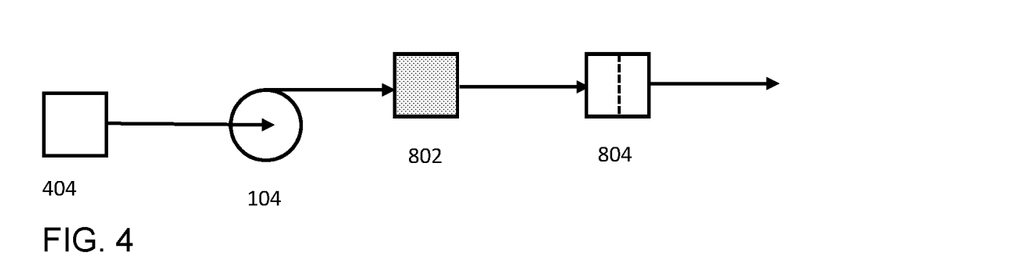
FIG. 4 is a schematic drawing of an embodiment of a brine source configuration of an apparatus according to the invention.

In an embodiment, the brine source 102 can include an untreated water supply 404 or a treated water supply. For example, the brine input flow control pump 104 can serve as a wastewater inlet pump (see FIG. 4) by receiving water input from an untreated water supply 404. The output of the brine input flow control pump 104 can be in fluid communication with a media filter 802, such as a sand filter. The media filter 802 can be, for example, a rapid (gravity) sand filter, upward flow sand filter, slow sand filter, or other sand filter, or a combination of these. The media filter can include natural sand, including, for example, silica ($SiO_2$), calcium carbonate ($CaCO_3$), and/or another mineral, or include a synthetic material, such as crushed glass, or include natural organic material, such as peat. The media filter can include a combination of materials, for example, a layer of sand and a layer of charcoal. The output of the media filter 802 can be in fluid communication with a filter 804. The filter 804 can be, for example, a strainer, screen, sieve, membrane, disk, adsorption, ion exchange, or other filter, or a combination of these. The filter 804 can be formed from a range of materials, including stainless steel or another metal or metal alloy, a polymer, such as polyethylene, polypropylene, nylon, polyester, or another polymer, ceramic, charcoal or activated carbon, or another material, or a combination of materials. The media filter 802 and/or the filter 804 can be capable of being backwashed, having the component that does the filtration, e.g., a membrane, be replaced, or otherwise being cleaned, regenerated, or replenished to remain effective. The output of the filter 804 can be in fluid communication with the anode chamber 108. The media filter 802 and filter 804 can be in other configurations, for example, one or both of them can, in terms of the water flow, be placed before the brine input flow control pump 104, the filter 804 can be placed before the media filter 802, or additional media filters 802 and/or filters 804 can be placed into the flow to filter the water from the untreated water supply 404 prior to its entry into the anode chamber 108. A turbidity meter or other device can be placed to monitor the purity of the water prior to its entry into the anode chamber 108. The turbidity value output by such a turbidity meter can, for example, be in data communication with the production control system, for example, to indicate to an operator when the water is too turbid and/or automatically shut the system down to protect the anode chamber 108.

Figure 5:
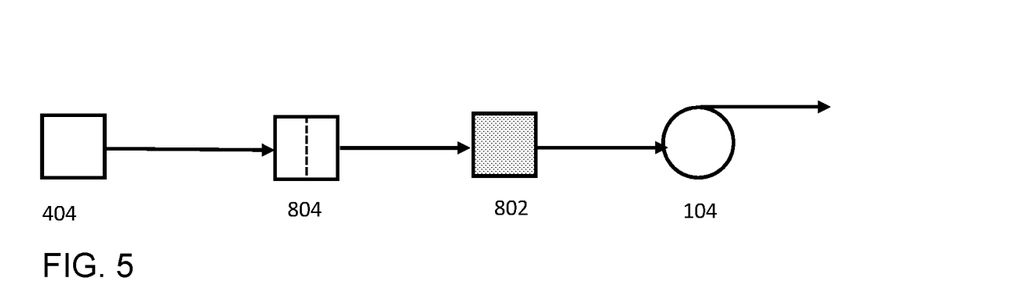
FIG. 5 is a schematic drawing of an embodiment of a brine source configuration of an apparatus according to the invention.

In an embodiment, the brine source 102 can include an untreated water supply 404 in fluid communication with a filter 804 (see FIG. 5). The output of the filter 804 can be in fluid communication with a media filter 802. The output of the media filter 802 can be in fluid communication with the brine source pump 104 (with the brine source pump 104, in turn, being in fluid communication with the anode chamber 108). For example, a turbidity meter 806 can be in fluid communication with the water that is output from the sand filter 802 and input to the brine source pump 104. The turbidity meter 806 can produce a turbidity value. The turbidity meter 806 can be in data communication with to provide the turbidity value to the production control system. For example, the production control system can compare the turbidity value with a turbidity target, and indicate to an operator when the turbidity value exceeds the turbidity target and/or automatically shut the system down or cause other action, such as shunting the water input to the brine control pump 104 to another set of media filters 802 and sand filters 804, to protect the brine control pump 104, the anode chamber 108, and/or the system as a whole.

The apparatus can include features for administering (dosing) the aqueous disinfectant produced to fluids other than water (reference in this context is made again to FIG. 2). For example, an untreated fluid supply 404 can be connected to (in fluid communication with) a treatment mixing chamber 402. The fluid in the untreated fluid supply can be a liquid or a gas. For example, the fluid in the untreated fluid supply can be an organic fluid, such as an organic liquid or an organic gas. For example, the untreated fluid supply can be natural gas, e.g., primarily methane from underground reservoirs, synthetic gas, e.g., coal gas or town gas, petroleum, e.g., light crude oil, heavy crude oil, synthetic crude oil (such as produced from tar sands), kerosene, jet fuel, diesel fuel, or another petroleum product, or a petrochemical product. A flow rate meter, termed in this position an untreated flow rate meter 410, can measure the rate of flow of untreated fluid from the untreated fluid supply 404, and provide an untreated flow rate value. The untreated flow rate value can be provided to the disinfectant dosing control system. The disinfectant output line 122 of the apparatus can be connected to the treatment mixing chamber 402 to feed disinfectant into the treatment mixing chamber 402. For example, the treatment mixing chamber 402 can include a static mixer. The treated fluid, containing the untreated fluid and the disinfectant, can exit the treatment mixing chamber 402 through a treated water supply output 406. A sensor 408, such as a hydrogen sulfide sensor that provides a hydrogen sulfide concentration value, can be in contact with (in fluid communication with) the treated fluid supply exiting the treatment mixing chamber at the treated fluid supply output 406. The hydrogen sulfide concentration value can be provided to the disinfectant dosing control system, which can compare the hydrogen sulfide concentration value to a hydrogen sulfide concentration target. To bring the hydrogen sulfide concentration value to the hydrogen sulfide concentration target, the disinfectant dosing control system can control process parameters such as the brine flow rate by adjusting the brine input flow control pump 104, a disinfectant backpressure by adjusting the disinfectant output backpressure control valve 118, a sodium hydroxide backpressure by adjusting the sodium hydroxide output backpressure control valve 120, and a differential pressure between the disinfectant output line and the sodium hydroxide output line by adjusting the blending valve 126. That is, the disinfectant control system can control the rate and/or concentration at which disinfectant is produced by the apparatus to add disinfectant to the untreated fluid of the untreated fluid supply 404 to approach or achieve reduction of the hydrogen sulfide concentration to the hydrogen sulfide concentration target.

For example, the disinfectant produced by such as system can be used to reduce the concentration of sulfate-reducing bacteria or other undesirable microorganisms in a natural gas or petroleum stream through addition of the disinfectant. For example, sulfate-reducing bacteria can generate hydrogen sulfide that can, for example, act to corrode downstream process equipment. Further, the disinfectant produced by such a system can oxidize hydrogen sulfide itself to sulfur, thus reducing the concentration of hydrogen sulfide in an a natural gas or petroleum stream. That is, the disinfectant produced by such a system can "sweeten" natural gas having a concentration of hydrogen sulfide that is too great ("sour gas") and similarly sweeten a petroleum having a concentration of hydrogen sulfide that is too great. For example, such a system can be used to reduce the concentration of hydrogen sulfide in natural gas, petroleum, and other fluids to less than about 0.1, 0.3, 1, 3, 10, 30, 100, 300, 1000, 3000, or 10000 ppm (parts per million by weight).

The embodiments illustrated and discussed in this specification are intended only to teach those skilled ways known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. An apparatus for producing an aqueous solution of hypochlorous acid disinfectant, comprising:
   a brine source,
   a brine input flow control pump in fluid communication with the brine source,
   an electrochemical cell comprising an anode chamber having an anode and a cathode chamber having a cathode,
   a membrane separating the anode chamber and the cathode chamber,
   the anode chamber in fluid communication with the brine input flow control pump,
   a disinfectant output control valve in fluid communication with the anode chamber that receives an anode liquid output from the anode chamber,
   a disinfectant output line in fluid communication with the disinfectant output control valve,
   a sodium hydroxide output control valve in fluid communication with the cathode chamber that receives a cathode liquid output from the cathode chamber,
   a sodium hydroxide output line in fluid communication with the sodium hydroxide output control valve,
   a blending valve in fluid communication with the disinfectant output line and the sodium hydroxide output line,
   an ion sensor that provides an ion sensor value in fluid communication with the disinfectant output line,
   a production control system in data communication with the ion sensor,
   the production control system being configured to compare the ion sensor value with an ion target,
   the production control system being configured to bring the ion sensor value to the ion target by controlling at least a brine flow rate with the brine input flow control pump, a disinfectant backpressure with the disinfectant output control valve, a sodium hydroxide backpressure with the sodium hydroxide output control valve, and a differential pressure between the disinfectant output line and the sodium hydroxide output line with the blending valve.

2. The apparatus of claim 1, wherein the ion sensor is a pH sensor, the ion sensor value is a pH value, and the ion target is a pH target.

3. The apparatus of claim 1, wherein the ion sensor is a free available chlorine (FAC) sensor, the ion sensor value is an FAC value, and the ion target is an FAC target.

4. The apparatus of claim 1, wherein the ion sensor is an oxidation-reduction potential (ORP) sensor, the ion sensor value is an ORP value, and the ion target is an ORP target.

5. The apparatus of claim 1, wherein the ion sensor is a conductivity sensor, the ion sensor value is a conductivity value, and the ion target is a conductivity target.

6. The apparatus of claim 1, wherein the ion sensor consists of one or more sensors selected from the group consisting of a pH sensor that provides a pH value with an associated pH target, a free available chlorine (FAC) sensor that provides an FAC value with an associated FAC target, an oxidation-reduction potential (ORP) sensor that provides an ORP value with an associated ORP target, and a conductivity sensor that provides a conductivity value with an associated conductivity target.

7. The apparatus of claim 1,
wherein the ion sensor comprises a pH sensor, a free available chlorine (FAC) sensor, and an oxidation-reduction potential (ORP) sensor,
wherein the pH sensor provides a pH value, the FAC sensor provides an FAC value, and the ORP sensor provides an ORP value,
wherein the ion target comprises a pH target component, an FAC target component, and an ORP target component.

8. The apparatus of claim 1, wherein the blending valve comprises a static mixer.

9. The apparatus of claim 1, wherein an anode output pressure sensor is in fluid communication with the anode chamber and is in data communication with the production control system.

10. The apparatus of claim 1,
wherein the disinfectant output line comprises a baffle tank in fluid communication with the disinfectant output control valve,
the baffle tank being configured to remove gas bubbles from the disinfectant in the disinfectant output line.

11. The apparatus of claim 10,
wherein the baffle tank comprises a headspace containing gas,
wherein an air input is in fluid communication with the headspace, and
wherein a gas output is in fluid communication with the headspace.

12. The apparatus of claim 10,
wherein the baffle tank comprises a liquid level gauge that provides a liquid level output,
the production control system in data communication with the liquid level gauge.

13. The apparatus of claim 12, wherein the liquid level gauge is a differential pressure sensor in fluid communication with a bottom of the baffle tank and a headspace of the baffle tank.

14. The apparatus of claim 1, further comprising:
a treatment mixing chamber,
an untreated water supply in fluid communication with the treatment mixing chamber,
the disinfectant output line in fluid communication with the treatment mixing chamber,
a treated water supply output in fluid communication with the treatment mixing chamber,
a treated ion sensor that provides a treated ion sensor value in fluid communication with the treated water supply output,
a disinfectant dosing control system in data communication with the treated ion sensor,
the disinfectant dosing control system being configured to compare the treated ion sensor value with a treated ion target,
the disinfectant dosing control system being configured to bring the treated ion sensor value to the treated ion target by controlling in data communication with the production control system at least a brine flow rate with the brine input flow control pump, a disinfectant backpressure with the disinfectant output control valve, a sodium hydroxide backpressure with the sodium hydroxide output control valve, and a differential pressure between the disinfectant output line and the sodium hydroxide output line with the blending valve.

15. The apparatus of claim 14, further comprising
an untreated flow rate meter that measures the flow rate of the untreated water supply and provides an untreated flow rate value,
wherein the disinfectant dosing control system is in data communication with the untreated flow rate meter.

16. The apparatus of claim 14, wherein the treated water supply output is in fluid communication with the anode chamber.

17. The apparatus of claim 1, wherein the brine source comprises
a source of water,
a source of sodium chloride,
a brine mixing chamber,
the source of water in fluid communication with the mixing chamber through a water valve or water pump,
the source of sodium chloride in fluid communication with the mixing chamber through a sodium chloride valve or sodium chloride pump,
the brine mixing chamber in fluid communication with the brine input flow control pump,
a brine conductivity sensor that provides a brine output conductivity value in fluid communication with the brine mixing chamber, and
a brine preparation control system in data communication with the brine conductivity sensor,
the brine preparation control system being configured to compare the brine output conductivity value with a brine output conductivity target, and
the brine preparation control system being configured to control at least a water flow rate with the water valve or water pump and a sodium chloride flow rate with the sodium chloride valve or sodium chloride pump to bring the brine output conductivity value to the brine output conductivity target.

18. The apparatus of claim 1, further comprising a self-cleaning system comprising:
an acid source,
an acid input flow pump in fluid communication with the acid source,
the anode chamber and/or the cathode chamber in fluid communication with the acid pump,
an acid drain valve in fluid communication with the anode chamber and/or the cathode chamber,
an acid drain line in fluid communication with the acid drain valve,
a conductivity sensor in electrical communication with the anode and in electrical communication with the cathode,
the conductivity sensor being configured to determine the conductivity value between the anode and the cathode,
a self-cleaning control system in data communication with the conductivity sensor, the self-cleaning control system being configured to compare the conductivity value with a conductivity set point, and
the self-cleaning control system being configured to bring the conductivity value to the conductivity set point by controlling in data communication with the production control system at least the brine flow rate with the brine input flow control pump, an acid flow rate with the acid input flow pump, and the acid drain valve.

19. The apparatus of claim 1,
wherein the anode liquid output is not recirculated to the anode chamber and is not recirculated to the cathode chamber and
wherein the cathode liquid output is not recirculated to the anode chamber and is not recirculated to the cathode chamber.

20. The apparatus of claim 1,
wherein a portion or all of the cathode liquid output is recirculated to the anode chamber.

21. The apparatus of claim 1, wherein the apparatus minimizes the production of hydrogen ($H_2$) gas.

22. The apparatus of claim 1, wherein the apparatus produces an insubstantial quantity of chlorine ($Cl_2$) gas.

23. The apparatus of claim 1, wherein the brine source comprises an untreated water supply.

24. The apparatus of claim 23,
wherein the untreated water supply is in fluid communication with the brine input flow control pump,
wherein the brine input flow control pump is in fluid communication with a sand filter,
wherein the sand filter is in fluid communication with a filter, and
wherein the filter is in fluid communication with the anode chamber.

25. The apparatus of claim 1, wherein the brine source comprises
an untreated water supply,
a filter in fluid communication with the untreated water supply,
a sand filter in fluid communication with the filter,
the sand filter in fluid communication with the brine input flow control pump, and
a turbidity meter that provides a turbidity value in fluid communication with the brine input flow control pump,
wherein the production control system is in data communication with the turbidity meter.

26. The apparatus of claim 14, wherein the treated water supply output as the brine source is in fluid communication with the brine input flow control pump.

27. The apparatus of claim 17, wherein the source of sodium chloride comprises an untreated water supply.

28. The apparatus of claim 1, further comprising:
a treatment mixing chamber,
an untreated water supply in fluid communication with the treatment mixing chamber,
the disinfectant output line in fluid communication with the treatment mixing chamber,
a treated water supply output in fluid communication with the treatment mixing chamber,
a hydrogen sulfide ($H_2S$) sensor that provides a hydrogen sulfide concentration value in fluid communication with the treated water supply output,
a disinfectant dosing control system in data communication with the hydrogen sulfide sensor,
the disinfectant dosing control system being configured to compare the hydrogen sulfide concentration value with a hydrogen sulfide concentration target, and
the disinfectant dosing control system being configured to bring the hydrogen sulfide concentration value to or to less than the hydrogen sulfide concentration target by controlling in data communication with the production control system at least a brine flow rate with the brine input flow control pump, a disinfectant backpressure with the disinfectant output control valve, a sodium hydroxide backpressure with the sodium hydroxide output control valve, and a differential pressure between the disinfectant output line and the sodium hydroxide output line with the blending valve.

29. The apparatus of claim 28, wherein the hydrogen sulfide ($H_2S$) concentration target is 30 ppm (parts per million by weight).

30. The apparatus of claim 1, further comprising:
a treatment mixing chamber,
an untreated fluid supply in fluid communication with the treatment mixing chamber,
the disinfectant output line in fluid communication with the treatment mixing chamber,
a treated fluid supply output in fluid communication with the treatment mixing chamber,
a hydrogen sulfide sensor that provides a hydrogen sulfide concentration value in fluid communication with the treated fluid supply output,
a disinfectant dosing control system in data communication with the hydrogen sulfide sensor,
the disinfectant dosing control system being configured to compare the hydrogen sulfide concentration value with a hydrogen sulfide concentration target, and
the disinfectant dosing control system being configured to bring the hydrogen sulfide concentration value to the hydrogen sulfide concentration target by controlling in data communication with the production control system at least a brine flow rate with the brine input flow control pump, a disinfectant backpressure with the disinfectant output control valve, a sodium hydroxide backpressure with the sodium hydroxide output control valve, and a differential pressure between the disinfectant output line and the sodium hydroxide output line with the blending valve.

31. The apparatus of claim 30, wherein the untreated fluid supply comprises an organic fluid selected from the group consisting of an organic gas, an organic liquid, natural gas, synthetic gas, petroleum, a petrochemical product, and combinations thereof.

32. A method for producing a disinfectant, comprising:
introducing brine at a brine flow rate into an anode chamber of an electrochemical cell with a brine input flow control pump,
applying a voltage between an anode of the anode chamber and a cathode of a cathode chamber of the electrochemical cell, the anode chamber separated from the cathode chamber by a membrane,
providing an anode liquid output from the anode chamber to a disinfectant output control valve in fluid communication with the anode chamber,
establishing a disinfectant output backpressure with the disinfectant output control valve,
obtaining a disinfectant from a disinfectant output line in fluid communication with the disinfectant output control valve,
providing a cathode liquid output from the cathode chamber to a sodium hydroxide output control valve in fluid communication with the cathode chamber,
establishing a sodium hydroxide output backpressure with the sodium hydroxide output control valve, further providing the cathode liquid output from the sodium hydroxide output control valve to a sodium hydroxide output line in fluid communication with the sodium hydroxide output control valve, establishing a differential pressure between the disinfectant output line and the sodium hydroxide output line with a blending valve in fluid communication with the disinfectant output line and the sodium hydroxide output line, measuring an ion concentration of the disinfectant in the disinfectant output line, comparing the ion concentration with an ion target, and bringing the ion concentration to the ion target by controlling the brine input flow control pump to regulate the brine flow rate, controlling the disinfectant output control valve to regulate the disinfectant output backpressure, controlling the sodium hydroxide output control valve to regulate the sodium hydroxide output backpressure, and controlling the blending valve to regulate the differential pressure between the disinfectant output line and the sodium hydroxide output line.

33. The method of claim 32, wherein the disinfectant comprises hypochlorous acid (HClO), sodium hypochlorite (NaClO), sodium chlorate (NaClO$_3$), or combinations thereof.

34. The method of claim 32, wherein the disinfectant comprises hypochlorous acid (HClO).

* * * * *